United States Patent
Kato et al.

(10) Patent No.: US 7,270,899 B2
(45) Date of Patent: Sep. 18, 2007

(54) ON-BOARD FUEL CELL POWERED ELECTRIC VEHICLE

(75) Inventors: Takashi Kato, Wako (JP); Makoto Anazawa, Wako (JP); Harumi Hatano, Wako (JP); Takayuki Ogawa, Wako (JP); Kiyoshi Shimizu, Wako (JP); Sachito Fujimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 382 days.

(21) Appl. No.: 10/717,331

(22) Filed: Nov. 18, 2003

(65) Prior Publication Data

US 2004/0101725 A1    May 27, 2004

(30) Foreign Application Priority Data

Nov. 18, 2002  (JP) .............................. 2002-333523

(51) Int. Cl.
*H01M 8/00* (2006.01)
(52) U.S. Cl. .............................. 429/12; 429/13; 429/34; 180/65.3
(58) Field of Classification Search .................. 429/12, 429/13, 34; 180/65.3
See application file for complete search history.

(56) References Cited

U.S. PATENT DOCUMENTS

| | | | |
|---|---|---|---|
| 5,641,031 A * | 6/1997 | Riemer et al. | 180/65.3 |
| 5,662,184 A | 9/1997 | Riemer et al. | |
| 6,223,843 B1 * | 5/2001 | O'Connell et al. | 180/65.3 |
| 6,223,844 B1 * | 5/2001 | Greenhill et al. | 180/65.3 |
| 6,378,637 B1 | 4/2002 | Ono et al. | |
| 6,394,207 B1 * | 5/2002 | Skala | 180/65.2 |
| 6,448,535 B1 | 9/2002 | Ap | |
| 2002/0060100 A1 | 5/2002 | Nagura et al. | |

FOREIGN PATENT DOCUMENTS

| | | |
|---|---|---|
| EP | 0 677 417 A1 | 10/1995 |
| EP | 1 132 251 A1 | 9/2001 |
| JP | 5-21084 | 1/1993 |
| JP | 9-231991 | 9/1997 |
| JP | 2001-71753 | 3/2001 |
| JP | 2001-216981 | 8/2001 |
| JP | 2001-268720 | 9/2001 |
| JP | 2002-89793 | 3/2002 |
| JP | 2002-165309 | 6/2002 |

* cited by examiner

*Primary Examiner*—Jane Rhee
(74) *Attorney, Agent, or Firm*—Lahive & Cockfield, LLP; Anthony A. Laurentano, Esq.

(57) ABSTRACT

A fuel cell vehicle comprises a fuel cell for generating electricity by hydrogen and air, a temperature regulating unit for regulating the temperature of the fuel cell, a fuel supply regulating unit for regulating a supply condition of hydrogen to the fuel cell, a humidification unit for supplying the fuel cell with water, a fuel cell output setting unit for setting whether electric power can be taken out of the fuel cell and an exhaust unit. The temperature regulating unit and the fuel cell output setting unit align in a transverse direction of the vehicle to constitute a first group, whereas the fuel supply regulating unit and the humidification unit align in the transverse direction of the vehicle to constitute a second group, whereby the first group, the fuel cell, the second group and the exhaust unit are disposed in that order from the front to rear of the vehicle.

8 Claims, 2 Drawing Sheets

ON-BOARD FUEL CELL POWERED ELECTRIC VEHICLE

BACKGROUND OF THE INVENTION

1. Field of the Invention

The present invention relates to an on-board fuel cell powered electric vehicle in which a fuel cell is installed, and more particularly, to anon-board fuel cell powered electric vehicle which is characteristic of the layout of the fuel cell and peripheral equipment thereto.

2. Description of the Related Art

An on-board fuel cell powered electric vehicle in which a fuel cell is installed (hereinafter, referred to as a fuel cell vehicle) is provided with a fuel cell for generating electric power for driving the vehicle. In order to generate electric power with the fuel cell, a fuel and an oxidant are needed, and thus, hydrogen which constitutes the fuel and air which constitutes the oxidant are supplied. Hydrogen function in gas the fuel is stored in, for example, a high pressure hydrogen container for direct supply to the fuel cell. Alternatively, a methanol material is reformed to generate hydrogen for supply to the fuel cell. On the other hand, as air, outside air is taken in for supply to the fuel cell.

In addition, provided on the fuel cell vehicle for the purpose of a preferred operation of the fuel cell are a temperature regulating unit for regulating the temperature of the fuel cell and a humidification unit for humidifying hydrogen and air that are supplied to the fuel cell. Provided on the fuel cell vehicle in addition to them are a radiator for cooling a cooling liquid in a cooling system, motors for driving wheels, an inverter for regulating electric current supplied to the motors and a power drive unit.

While all these apparatuses are installed on the fuel cell vehicle, U.S. Pat. No. 6,223,843 discloses, for example, a layout in the related art used when those apparatuses are installed on a fuel cell vehicle.

In this fuel cell vehicle which is of a fuel reforming type, a fuel tank for an original fuel is disposed at a rear part of the vehicle, whereas the other apparatuses such as a fuel cell, a temperature regulating unit, a humidification unit and a reformer are all disposed at a front part of the vehicle.

Moreover, fuel cells are widely employed in other areas where electric power generation is needed (refer to JP-A-5-21084, for example).

In a unitized fuel cell electric power generation system disclosed in JP-A-5-21084, a fuel cell electric power generation system is broken into a plurality of function-specific systems, and constituent elements of the function-specific system so broken are assembled on independent trestle tables provided on a frame to thereby constitute a plurality of function-specific units. Then, the plurality of function-specific units are provided on a common trestle table for integration. With the unitized fuel cell electric power generation system constructed as described above, assembling work can be eased and assembling time can be saved, and therefore, the unitized fuel cell electric power generation system is suitable for continuous production. In addition, dismantlement for inspection and repair can also be eased and time to be spent for such purposes can also be saved.

In the fuel cell vehicle disclosed in U.S. Pat. No. 6,223,843, however, since the respective apparatuses including the fuel cell that are used for in the fuel cell system are disposed at the front part of the vehicle, there exists a disadvantage that these apparatuses are easily subjected to a damage, for example, in case an excessive impact is applied to the vehicle from the front thereof.

In addition, since a large space for installing all those apparatuses is required to be provided at the front part of the vehicle, there is caused a drawback that spaces for placement of feet of the driver and a front passenger seat occupant in a passenger compartment, as well as spaces in the passenger and luggage compartments are affected.

Furthermore, the weight of the fuel cell itself becomes heaviest among the respective constituent elements, and in the event that the fuel cell which is that heavy is installed in the front part of the vehicle, the behavioral stability of the vehicle may be affected.

On the other hand, a unitized fuel cell electric power generation system such as disclosed in JP-A-5-21084 is intended to be fixedly placed in, for example, a plant and is therefore intended to be applied to automobiles. In an attempt to install such a fuel cell electric power generation system on an automobile for use thereon, due to the availability of space for the system, the systems is preferably disposed under a floor of the vehicle, in which case the following problems.

Firstly, when installed on an automobile, the fuel cell electric power generation system needs to be protected from water, mud, chipping and the like. However, the fuel cell electric power generation system disclosed in Patent Literature No. 2 is not constructed to have such a protecting function.

In addition, in the fuel cell electric power generation system disclosed in JP-A-5-21084, the respective units are so exposed and are easily subjected to an access from the outside. A component or components generating high voltages are included in the fuel cell electric power generation system, and it is not preferable that those components come into each contact from the outside. In the fuel cell electric power generation system disclosed in JP-A-5-21084, however, there is provided no construction having a function to prevent a contact with those high-voltage components.

SUMMARY OF THE INVENTION

Then, an object of the invention is to provide an on-board fuel cell powered electric vehicle which can prevent the damage of apparatuses, in particular, a fuel cell of a fuel cell system even if an excessive impact is applied to the vehicle from the outside thereof, which can secure sufficient spaces in the passenger and luggage compartments, which can additionally protect the fuel cell system from water, mud, chipping and the like while making it impossible for the high-voltage components of the fuel cell system to be contacted from the outside, and which can further provide a superior behavioral stability.

With a view to solving the problems, according to a first aspect of the invention, there is provided an on-board fuel cell powered electric vehicle (for example, an on-board fuel cell powered electric vehicle V in an embodiment that will be described later on) comprising a fuel cell (for example, a fuel cell 14 in the embodiment that will be described later on) for generating electricity by being supplied with a fuel (for example, hydrogen in the embodiment that will be described later on) and an oxidant (for example, air in the embodiment that will be described later on), a temperature regulating unit (for example, a water pump 11 and a thermostat valve 12 in the embodiment that will be described later on) for regulating the temperature of the fuel cell by sending out a cooling fluid (for example, a cooling water in the embodiment that will be described later on) through a pipe unit (for example, cooling water pipings 21 to 25 in the embodiment that will be described later on), a fuel supply regulating unit (for example, a hydrogen pump 16 and an ejector 17 in the embodiment that will be described later on) for regulating a supply condition in which the fuel is supplied to the fuel cell, a humidification unit (for example, a humidification unit 15 in the embodiment that will be described later on) for supplying water to the fuel cell by humidifying at least one of the fuel and the oxidant using a humidifier, a fuel cell output setting unit (for example, a fuel cell output setting unit 13 in the embodiment that will be described later on) for setting whether or not electric power can be taken out of the fuel cell, and an exhaust unit (for example, an exhaust unit 19 in the embodiment that will be described later on) for exhausting a gas discharged from the fuel cell from a rear of the vehicle, wherein the temperature regulating unit and the fuel cell output setting unit are arranged to align in a transverse direction of the vehicle so as to constitute a first group (for example, a first group G1 in the embodiment that will be described later on), whereas the fuel supply regulating unit and the humidification unit are arranged to align in the transverse direction of the vehicle so as to constitute a second group (for example, a second group G2 in the embodiment that will be described later on), whereby the first group, the fuel cell, the second group and the exhaust unit are arranged to align in that order from the front to rear of the vehicle.

According to the construction, since the apparatuses are arranged in the first and second groups, the lengths of the first and second groups in the longitudinal direction of the vehicle can be decreased. In addition, since the first group, the fuel cell, the second group and the exhaust unit are arranged so as to align in the longitudinal direction of the vehicle rather than being collected at one location, the constraint on securement of sufficient spaces in the passenger and luggage compartments can be reduced.

According to a second aspect of the invention, there is provided an on-board fuel cell powered electric vehicle as set forth in the first aspect of the invention, wherein a radiator (for example, a radiator 9 in the embodiment that will be described later) for cooling the cooling fluid is disposed ahead of the first group in a longitudinal direction of the vehicle, and wherein a fuel storage unit (for example, a fuel tank 7 in the embodiment that will be described later on) for storing the fuel is disposed rearward of the second group in the longitudinal direction of the vehicle.

According to the construction, the length of the piping of the cooling system through which the cooling fluid flows can be decreased, and the length of the piping of the fuel system through which fuel flows can also be decreased.

According to a third aspect of the invention, there is provided an on-board fuel cell powered electric vehicle as set forth in the first or second aspect of the invention, wherein the fuel cell is disposed substantially at a central position in the longitudinal direction of the vehicle.

According to the construction, since the heavy fuel cell is disposed substantially at the central position in the longitudinal direction of the vehicle, the longitudinal weight balance of the vehicle is improved. In addition, even when an excessive impact is applied to a front part of the vehicle from the outside, there can be avoided a risk that the impact so applied is directly transferred to the fuel cell.

According to a fourth aspect of the invention, there is provided an on-board fuel cell powered electric vehicle as set forth in the third aspect of the invention, wherein the first group, the fuel cell, the second group, and the exhaust unit are accommodated in a fuel cell system box (for example, a fuel cell system box 10 described in the embodiment that will be described later on) disposed under a floor of the vehicle.

According to the construction, the apparatuses including the fuel cell which are accommodated in the fuel cell system box can be protected from inputs from the outside such as water, mud, chipping and the like, and the serviceability of these apparatuses for maintenance can also be improved. In addition, a sudden and unexpected operation of the fuel cell output setting unit can be prevented.

According to a fifth aspect of the invention, there is provided an on-board fuel cell powered electric vehicle (for example, an on-board fuel cell powered electric vehicle V in an embodiment that will be described later on) comprising a fuel cell (for example, a fuel cell 14 in the embodiment that will be described later on) for generating electricity by being supplied with a fuel (for example, hydrogen in the embodiment that will be described later on) and an oxidant (for example, air in the embodiment that will be described later on), a temperature regulating unit (for example, a water pump 11 and a thermostat valve 12 in the embodiment that will be described later on) for regulating the temperature of the fuel cell by sending out a cooling fluid (for example, a cooling water in the embodiment that will be described later on) through a pipe unit (for example, cooling water pipings 21 to 25 in the embodiment that will be described later on), a fuel supply regulating unit (for example, a hydrogen pump 16 and an ejector 17 in the embodiment that will be described later on) for regulating a supply condition in which the fuel is supplied to the fuel cell, a radiator (for example, a radiator 9 in the embodiment that will be described later) for cooling the cooling fluid and a fuel storage unit (for example, a fuel tank 7 in the embodiment that will be described later on) for storing the fuel, wherein the radiator, the temperature regulating unit and the fuel supply regulating unit are arranged to align in that order from the front to rear of the vehicle, with the fuel storage unit being disposed rearward of the fuel supply regulating unit in a longitudinal direction of the vehicle, and wherein the temperature regulating unit, the fuel cell and the fuel supply regulating unit are accommodated in a fuel cell system box (for example, a fuel cell system box 10 described in the embodiment that will be described later on) disposed on an underside of a floor of the vehicle.

According to the construction, since the temperature regulating unit, the fuel cell and the fuel supply regulating unit are arranged so as to align in the longitudinal direction of the vehicle rather than being collected at one location, the constraint on securement of sufficient spaces in the passenger and luggage compartments can be reduced.

According to a sixth aspect of the invention, there is provided an on-board fuel cell powered electric vehicle as set forth in the fifth aspect of the invention, further comprising a cooling fluid piping (for example, cooling water pipings 21 to 25 in the embodiment that will be described later on) through which a cooling fluid flows which has implemented a heat exchange by passing through the temperature regulating unit, wherein a fuel cell inlet of the cooling fluid piping (for example, cooling water inlet 14*b* in the embodiment that will be described later on) through which the cooling fluid is sent in toward the fuel cell and a fuel cell outlet of the cooling fluid piping (for example, cooling water outlet 14*a* in the embodiment that will be described later on) through which the cooling fluid is sent out from the fuel cell are disposed at longitudinally rear positions of the vehicle.

According to the construction, since the length of the cooling fluid piping can be decreased to a shortest level while securing a certain insulation distance, not only can the weight of the cooling fluid piping be decreased but also the quantity of the cooling fluid held within the cooling fluid piping can be decreased. Therefore, since the quantity of the cooling fluid can be decreased to a minimum level, it is possible to attempt to decrease the weight of the fuel cell vehicle.

According to a seventh aspect of the invention, there is provided an on-board fuel cell powered electric vehicle as set forth in the sixth aspect of the invention, wherein the cooling fluid piping is disposed relative to the fuel supply regulating unit in such a manner as to enable a heat exchange therebetween.

According to the construction, the increase of the length of the cooling fluid piping can be restrained at the minimum while making it possible to regulate the temperature of the fuel supply regulating unit by using the cooling fluid held in the cooling fluid piping.

According to a eighth aspect of the invention, there is provided an on-board fuel cell powered electric vehicle as set forth in the sixth aspect of the invention, further comprising a humidification unit for supplying the fuel cell with water by humidifying at least one of the fuel and the oxidant using a humidifier, the humidification unit being provided in the fuel cell system box, wherein the fuel supply regulating unit and the humidification unit are arranged to align in the transverse direction of the vehicle, and wherein the cooling fluid piping is disposed relative to the humidification unit in such a manner as to enable a heat exchange therebetween.

According to the construction, the increase of the volume of the fuel cell system box which is caused by accommodating the humidification unit therein can be restrained while making it possible to regulate the temperature of the humidification unit by using the cooling fluid held in the cooling fluid piping.

According to a ninth aspect of the invention, there is provided an on-board fuel cell powered electric vehicle as set forth in the fifth aspect of the invention, further comprising a fuel piping through which a fuel flows which has passed through the fuel supply regulating unit, wherein a fuel cell inlet of the fuel piping through which the fuel is introduced into the fuel cell and a fuel cell outlet of the fuel piping through which the fuel is discharged from the fuel cell are disposed at longitudinally rear positions of the vehicle.

According to the construction, the length of the fuel piping can be decreased to a shortest dimension.

DETAILED DESCRIPTION OF THE INVENTION

Figure 1:
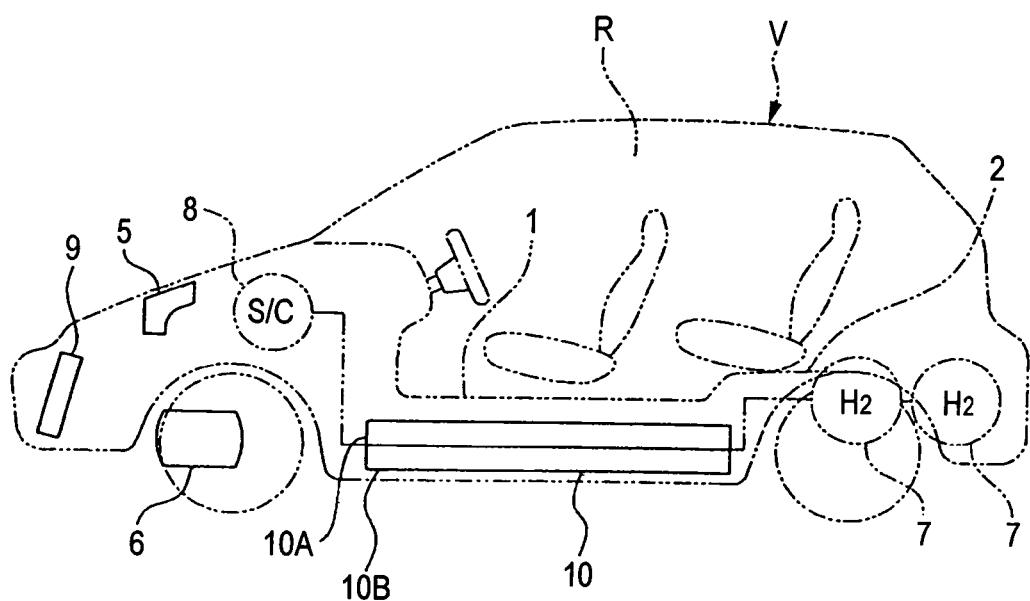
FIG. 1 is a perspective side view of an on-board fuel cell powered electric vehicle according to an embodiment of the invention.
Figure 2:
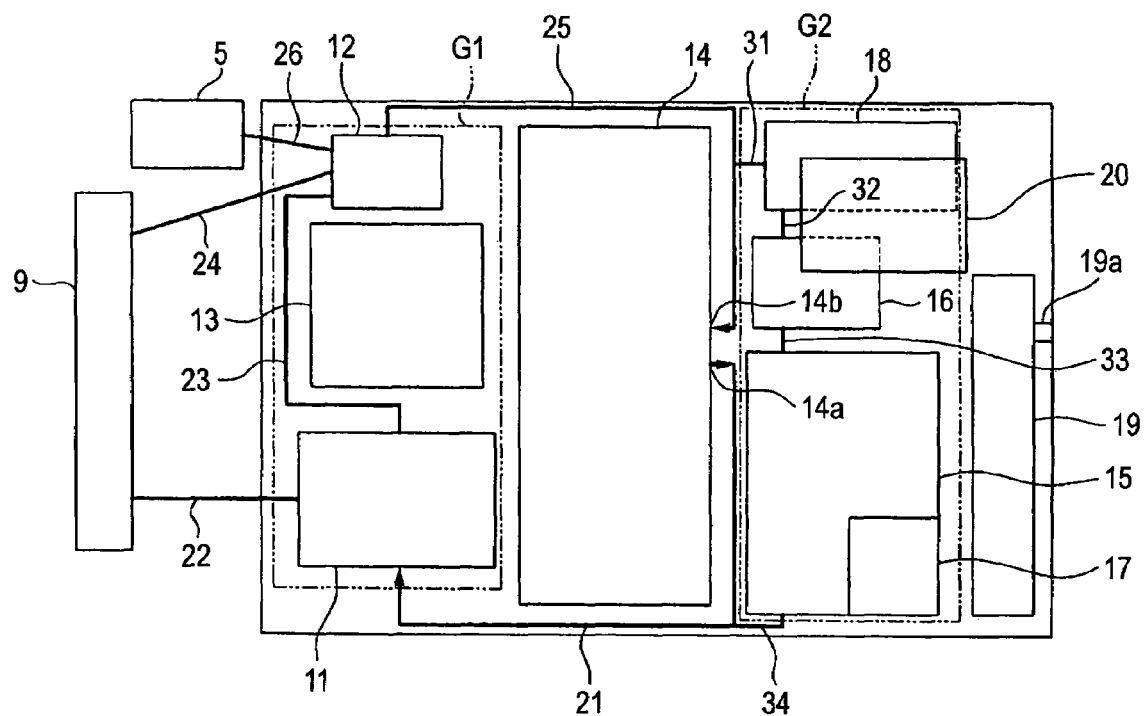
FIG. 2 is a plan view of a fuel cell system box according to the embodiment, illustrating a layout of apparatuses accommodated therein.
Figure 3:
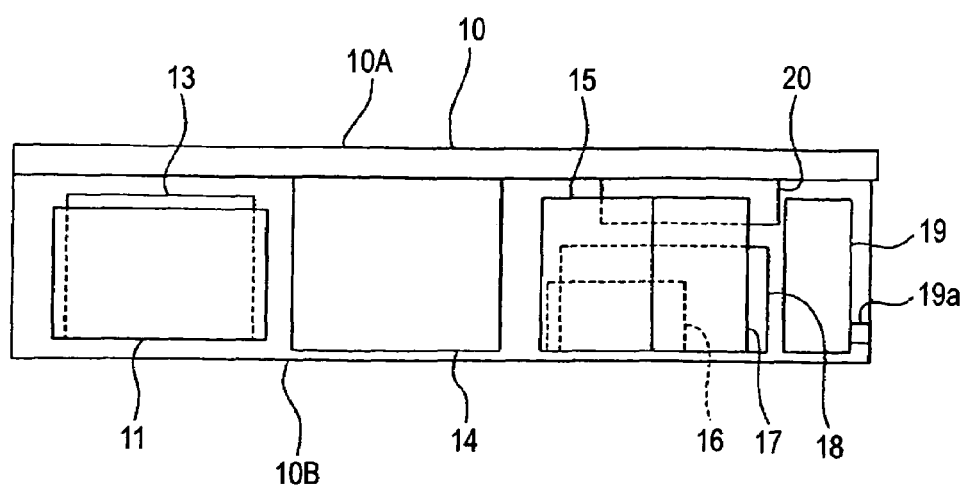
FIG. 3 is a side view of the fuel cell system box according to the embodiment, illustrating the layout of the apparatuses accommodated therein.

Referring to FIGS. 1 to 3, an embodiment of an on-board fuel cell powered electric vehicle according to the invention will be described below.

FIG. 1 is a perspective side view of an on-board fuel cell powered electric vehicle (hereinafter, referred simply to as a fuel cell vehicle) V according to the invention.

A rear floor 2 is connected to a front floor 1 of the fuel cell vehicle V in such a manner as to rise rearward. A fuel cell system box (hereinafter, referred simply to as an FC system box) 10 is attached to a vehicle body member, not shown, substantially at a longitudinally central location of the vehicle under the front floor 1 thereof. Then, a passenger compartment R is formed above the FC system box 10.

A radiator 9 is provided at a front end portion of the fuel cell vehicle V, a vehicle driving motor 6 is provided rearward of the radiator 9, an air compressor 8 is provided above the driving motor 6, and the FC system box 10 is disposed rearward of the air compressor 8. In addition, high pressure fuel tanks (fuel storage unit) 7, 7 where hydrogen gas functioning as a fuel for a fuel cell 14 is stored are attached to locations which are rearward of the FC system box 10 and are in the vicinity of a rear wheel.

The radiator 9 is such as to cool a cooling water (a cooling fluid) which is a heat medium using airflows generated when the fuel cell vehicle V runs. The air compressor 8 is such as to supply air functioning as an oxidant to the fuel cell 14.

The FC system box 10 is a closed container and includes a box main body 10B and a box cover 10A which is fixed to a top of the box main body 10B.

As shown in FIGS. 2 and 3, accommodated in the FC system box 10 are a water pump 11 and a thermostat valve 12 which constitute together part of a temperature regulating unit, a fuel cell output setting unit 13, the fuel cell 14, a humidification unit 15, a fuel supply regulating unit comprising a hydrogen pump 16 and an ejector 17, a fuel supply regulation control unit 18 for controlling the fuel supply regulating unit, an exhaust unit 19 and a fuel cell system control unit 20 for controlling the whole fuel cell system.

The fuel cell 14 is disposed substantially centrally in the longitudinal direction of the vehicle in the FC system box. The water pump 11, the thermostat valve 12 and the fuel cell output setting unit 13 are disposed longitudinally ahead of the fuel cell 14 as a first group G1, and the fuel supply regulating unit including the hydrogen pump 16 and the ejector 17, the humidification unit 15 and the fuel supply regulation control unit 18 are disposed as a second group G2 longitudinally rearward of the fuel cell 14. In addition, the exhaust unit 19 is disposed longitudinally rearward of the second group G2 and the fuel cell system control unit 20 is disposed above the second group G2. Namely, the first group G1, the fuel cell 14, the second group G2 and the exhaust unit 19 are disposed longitudinally in that order from the front to rear of the vehicle within the FC system box 10.

In the first group G1, the fuel cell output setting unit 13 is disposed substantially centrally in the transverse direction of the vehicle, and the water pump 11 is disposed transversely to the left of the fuel cell output setting unit 13, whereas the thermostat valve 12 is disposed transversely to the right of the fuel cell output setting unit 13. Note that, in this application, the "transverse direction of the vehicle" or "transversely" means a "transverse direction" or "transversely" that result when viewing from the passenger compartment R of the fuel cell vehicle V to the front thereof.

In the second group G2, the fuel supply regulating unit (including the ejector 17 but) excluding the hydrogen pump 16 and the humidification unit 15 are disposed transversely on the left-hand side of the vehicle, the hydrogen pump 16 is disposed to the right of the humidification unit 15, and the fuel supply regulation control unit 18 is disposed to the right of the hydrogen pump 16. Here, the "fuel supply regulating unit excluding the hydrogen pump 16" includes a pressure regulator valve for controlling the flow rate by decreasing the pressure of hydrogen supplied from the fuel tank 7. The fuel supply regulating unit excluding the hydrogen pump 16 and the humidification unit 15 are integrated into a single unit in advance.

The fuel cell 14 generates electricity using as a reaction gas hydrogen gas supplied from the fuel tank 7 and oxygen contained in air supplied from the compressor 8 so as to supply the driving motor 6 with electric power. The fuel cell 14 includes two cell stacks which are arranged to be transversely adjacent to each other, each cell stack having a multiplicity of cells stacked together in the longitudinal direction of the vehicle. The longitudinal stacking of the cells makes it difficult for shear and/or bending force generated by a longitudinal acceleration to be applied between the cells, thereby making it difficult for deviation and/or strain to occur between the cells. Thus, the form of the cell stack can be maintained in a normal condition.

A cooling water inlet 14b is provided on the fuel cell 14 at a longitudinally rearward and transversely rightward position thereof, and a cooling water outlet 14a is provided at a longitudinally identical but transversely leftward position thereof. In addition, while not shown, a hydrogen inlet and an anode off-gas outlet are also provided at longitudinally rearward positions of the fuel cell 14.

The water pump 11 is a pump for sending out a cooling water to the fuel cell 14 for cooling the same fuel cell 14, and the thermostat valve 12 is a valve for changing over flows of the cooling water depending on the temperature thereof between a flow which passes through the radiator 9 and a flow which bypasses the same radiator 9.

To be specific, the cooling water outlet 14a of the fuel cell 14 connects to a suction opening of the water pump 11 via a cooling water piping 21, and a discharge opening of the water pump 11 connects to an inlet of the radiator 9 via a cooling water piping 22 and to a first port of the thermostat valve 12 via a cooling water piping 23. An outlet of the radiator 9 connects to a second port of the thermostat valve 12 via a cooling water piping 24, and a third port of the thermostat valve 12 connects to the cooling water outlet 14b of the fuel cell 14 via a cooling water piping 25.

The thermostat valve 12 changes over flows of the cooling water in such a manner that the cooling water flows to bypass the radiator 9 when the temperature of the cooling water is low, whereby the cooling water sent out from the water pump 11 flows to pass through the cooling water piping 23, the thermostat valve 12 and the cooling water piping 25 and is then supplied to the fuel cell 14. On the other hand, when the temperature of the cooling water is high, the thermostat valve 12 changes over flows of the cooling water in such a manner that the cooling water flows into the radiator 9, whereby the cooling water sent out from the water pump 11 flows to pass through the cooling water piping 22, the radiator 9, the cooling piping 24, the thermostat valve 12 and the cooling piping 25 and is then supplied to the fuel cell 14, in which case the cooling water cooled by the radiator 9 is supplied to the fuel cell 14. The temperature of the fuel cell 14 is thus controlled to stay at a predetermined temperature by changing over flows of the cooling water by the thermostat valve 12 like this.

The cooling water piping 25 connects to a pressure balancer 5 placed within a front fender (not shown) of the fuel cell vehicle V via a cooling water piping 26. The pressure balancer 5 is such as to regulate air and cooling water pressures on a cathode side within the fuel cell 14 and constitutes part of the temperature regulating unit. In other words, the temperature regulating unit includes the water pump 11, the thermostat valve 12 and the pressure balancer 5.

A switch, not shown, is provided on the fuel cell output setting unit 13, and whether or not electric power can be taken out of the fuel cell 14 can be set by controlling this switch.

The humidification unit 15 is such as to supply the fuel cell 14 with water and includes a cathode humidifier for humidifying air which is an oxidant supplied to a cathode of the fuel cell 14 to an appropriate humidity and an anode humidifier for humidifying hydrogen supplied to an anode of the fuel cell 14 to an appropriate humidity.

Since unconverted hydrogen is contained in an anode off-gas discharged from the anode of the fuel cell 14, in an attempt to improve the fuel consumption of this fuel cell system, the anode off-gas is returned to a hydrogen supply path (not shown) for introducing hydrogen in the fuel tank 7 to the fuel cell 14 for reuse. As this occurs, unit for sending the anode off-gas into the hydrogen supply path are the hydrogen pump 16 and the ejector 17.

The fuel supply regulation control unit 18 includes a power supply/control unit of the hydrogen pump 16 and is controlled by the fuel cell system control unit 20.

Incidentally, the fuel supply regulation control unit 18 has an electric apparatus which causes a DC/DC converter to generate and release heat and the hydrogen pump 16 which rotates at high speeds also generates and releases heat. Thus, these apparatuses need to be cooled. On the other hand, the humidification unit 15 needs to be heated close to the temperature of the fuel cell 14 in a normal operation in order to increase the humidifying performance thereof. Then, in this fuel cell system, part of the cooling water is also circulated through the fuel supply regulation control unit 18, the hydrogen pump 16 and the humidification unit 15. To make this happen, a cooling water piping 31 branched off the cooling water piping 25 connects to a cooling water inlet of the fuel supply regulation control unit 18, a cooling water outlet of the fuel supply regulation control unit 18 connects to a cooling water inlet of the hydrogen pump 16 via a cooling water piping 32, a cooling water outlet of the hydrogen pump 16 connects to a cooling water inlet of the humidification unit 15 via a cooling water piping 33, and a cooling water outlet of the humidification unit 15 connects to the cooling water piping 21 via a cooling water piping 34.

Thus, the cooling water before the introduction into the fuel cell 14 which is lowest in temperature can be supplied into the fuel supply regulation control unit 18 to cool the same and then into the hydrogen pump 16 to cool the same pump through the connections of the cooling water pipings 31 to 34 as has been described above. Then, the cooling water whose temperature has been increased as a result of heat exchanges with the fuel supply regulation control unit 18 and the hydrogen pump 16 is supplied to the humidification unit 15 to warm up the same. The cooling water which has so warmed up the humidification unit 15 then joins with the cooling water which has been warmed up as a result of cooling the fuel cell 14 at the cooling water piping 21 and the cooling waters are then sucked into the water pump 11.

In addition, as has been described above, while the anode off-gas of the fuel cell 14 is circulating, since the electricity generating performance of the fuel cell 14 is badly affected in the event that water collects or the concentration of an impurity such as nitrogen is increased on the anode side, in this fuel cell system, a discharge valve (not shown) provided along an anode off-gas circulating system for discharging a fluid is opened as required so as to discharge anode off-gas together with water and impurity that have collected on the anode side. It is the exhaust unit 19 that dilutes the anode off-gas so discharged with a cathode off-gas discharged from a cathode of the fuel cell 14 so as to decrease the hydrogen concentration and expels the resulting off-gas from the rear of the vehicle. The exhaust unit 19 has an exhaust pip 19a which extends longitudinally rearward, and an exhaust pipe (not shown) provided on an exterior portion of the FC system box 10 connects to the exhaust pipe 19a so that a gas discharged from the fuel cell 14 is expelled to the outside of the vehicle.

The fuel cell vehicle V that is constructed as has been described above provides the following function and advantages.

Since the apparatuses constituting a main part of the fuel cell system such as the temperature regulating unit (the water pump 11, the thermostat valve 12), the fuel cell output setting unit 13, the fuel cell 14 and the humidification unit 15, as well as the fuel supply regulating unit (the hydrogen pump 16, the ejector 17), the fuel supply regulation control unit 18, the exhaust unit 19 and the fuel cell system control unit 20 are accommodated in the closed FC system box 10 attached to the underside of the floor of the vehicle, these constituent elements can be protected from external inputs such as water, mud and chipping, and the serviceability of these constituent elements for maintenance can be increased.

Since the fuel cell 14 is such that the apparatuses including the high-voltage parts such as the fuel supply regulation control unit 18 are accommodated in the closed FC system box 10, a mechanic can be prevented from coming into contact with the high-voltage parts when maintaining the fuel cell vehicle V. In addition, since the fuel cell output setting unit 13 is accommodated within the closed FC system box 10, an abrupt operation of the fuel cell output setting unit 13 can be prevented.

Since the water pump 11, the thermostat valve 12 and the fuel cell output setting unit 13 are arranged to align transversely in the first group G1 which is disposed within the FC system box 10 at a longitudinal front part thereof, the longitudinal length of the first group G1 can be decreased.

The fuel supply regulating unit including the hydrogen pump 16 and the ejector 17, the humidification unit 15 and the fuel supply regulation control unit 18 are arranged to align transversely in the second group G2 which is disposed within the FC system box 10 at a longitudinal rear part thereof, the longitudinal length of the second group 2 can be decreased. Furthermore, since the first group G1, the fuel cell 14, the second group G2 and the exhaust unit 19 are arranged to align longitudinally, the height of the FC system box 10 placed on the underside of the floor can be decreased, whereby there is provided less constraint on space securement in the passenger compartment R. As a result, a sufficient space can be secured in the passenger compartment R.

Since the FC system box 10 is disposed substantially centrally in the longitudinal direction of the vehicle with the relatively heavy fuel cell 14 being disposed substantially centrally within the FC system box 10, the longitudinal weight balance of the vehicle becomes stable, and as a result, the behavioral stability of the fuel cell vehicle V can be increased. In addition, even when an excessive impact is applied to the front or rear of the fuel cell vehicle V from the outside, a direct transfer of the impact so applied to the fuel cell 14 can be avoided, thereby making it difficult for the fuel cell 14 to be subjected to a damage.

Since the radiator 9 is disposed at the front end portion of the fuel cell vehicle V from which outside air can easily be taken in with the water pump 11, the thermostat valve 12 and the pressure balancer 5 being interposed between the radiator 9 and the fuel cell 14, these apparatuses can be disposed so as to follow the flow of cooling water, and moreover, since the cooling water outlet and inlet 14a, 14b of the fuel cell 14 are disposed at the longitudinally rearward positions of the fuel cell 14, the length of the cooling water pipings 21 to 26 can be decreased to a shortest level while securing a certain insulation distance. As a result, not only can the weight of the piping be decreased but also the quantity of cooling water held within the piping can be decreased, whereby the quantity of cooling water can be decreased to a minimum level, thereby making it possible to attempt to decrease the weight of the fuel cell vehicle V.

Furthermore, since the apparatuses of the hydrogen supply system that need to be cooled such as the humidification unit 15, the hydrogen pump 16 and the fuel supply regulation control unit 18 are disposed longitudinally rearward of the fuel cell 14, the length of the cooling water pipings 31 to 34 which form the cooling water path which extends by way of these apparatuses can be decreased to a shortest dimension. As a result, not only can the weight of the piping be decreased but also the quantity of cooling water held within the piping can be decreased, whereby the quantity of cooling water can be decreased to a minimum level, thereby making it possible to attempt to decrease the weight of the fuel cell vehicle V.

In addition, the fuel supply regulation control unit 18 and the hydrogen pump 16 can be cooled with the cooling water before the introduction into the cooling water inlet 14b of the fuel cell 14 which is lowest in temperature, and moreover, the humidification unit 15 can be warmed up with the cooling water whose temperature has been increased as a result of the heat exchanges so made with the fuel supply regulation control unit 18 and the hydrogen pump 16.

Since the apparatuses of the hydrogen supply system such as the fuel supply regulating unit including the hydrogen pump 16 and the ejector 17, and the humidification unit 15 are interposed between the fuel tank 7 and the fuel cell 14, the piping length of the hydrogen supply system can be decreased to a shortest dimension, whereby the weight of the piping can be decreased, thereby making it possible to attempt to decrease the weight of the fuel cell vehicle V. In addition, since the quantity of hydrogen held within the piping of the hydrogen supply system can be suppressed to a minimum level, the fuel control response can be increased, whereby there is provided an advantage that the output control response of the fuel cell 14 can be increased. Additionally, since the humidification unit 15 is disposed in the vicinity of the fuel cell 14, the length of the piping connecting the humidification unit 15 with the fuel cell 14 can be decreased to a shortest dimension, and as a result, hydrogen humidified and warmed up by the humidification unit 15 can be supplied to the fuel cell 14 before the hydrogen is cooled, whereby hydrogen can be supplied to the fuel cell 14 before water imparted thereto through humidification is condensed.

Since the fuel cell output setting unit 13 is disposed in the vicinity of the fuel cell 14 in such a manner as to be adjacent thereto in a planar fashion, the length of an output cable which connects the fuel cell 14 with the furl cell output setting unit 13 can be decreased to a shortest dimension.

In addition, since the fuel supply regulation control unit 18 is disposed in the vicinity of the hydrogen pump 16, the lengths of an electric power supply cable and a control cable which connect to the hydrogen pump 16 can be decreased to a shortest dimension.

Thus, since the lengths of the cables can be decreased to the shortest dimensions, the weights of the cables can be decreased, thereby making it possible to attempt to decrease the weight of the fuel cell vehicle V.

Since the exhaust unit 19 is disposed at a longitudinally rearmost or rear end portion within the FC system box 10, the length of routing of the exhaust pipe 19a within the FC system box 10 can be decreased to a shortest dimension.

Since the pressure balancer 5 is disposed within the front fender, an abrupt operation of the pressure balancer 5 can be prevented.

Other Embodiments of the Invention

Note that the invention is not limited to the embodiment that has been described above.

For example, while, in the previous embodiment, the hydrogen pump 16 and the ejector 17 are used as means for circulating anode off-gas, anode off-gas may be circulated by means of either of the hydrogen pump 16 and the ejector 17.

In addition, while, in the previous embodiment, the fuel tanks are used as a fuel storage unit, a hydrogen tank can be used instead which incorporates therein a hydrogen occluding alloy.

Additionally, the invention can be applied to an on-board fuel cell powered electric vehicle which incorporates therein a fuel reformer for reforming an original fuel of hydrocarbon such as methanol to produce hydrogen rich gas and in which hydrogen produced by the fuel reformer is then used as a fuel for a fuel cell incorporated in the vehicle. In this case, an original fuel tank for storing the original fuel is disposed longitudinally rearward of the fuel cell, so that the fuel reformer is preferably disposed between the original fuel tank and the fuel cell.

Thus, as has been described heretofore, according to the first aspect of the invention, since the longitudinal lengths of the first group and second group can be decreased and the first group, the fuel cell, the second group and the exhaust unit are arranged to align in the longitudinal direction of the vehicle rather than being collected at a single location, the constraint on space securement in the passenger and luggage compartments can be reduced, and as a result, there is provided a superior advantage that sufficient spaces can be secured in the passenger and luggage compartments.

According to the second aspect of the invention, since the length of the cooling system piping through which cooling water flows can be shortened, the weight of the piping and the quantity of cooling fluid held within the piping can be decreased, and as a result, there can be provided an advantage that the vehicle weight is attempted to be decreased. In addition, the length of the fuel system piping through which fuel flows can be shortened, the weight of the piping can be decreased, whereby not only can the weight of the piping be decreased so as to attempt to reduce the vehicle weight but also the fuel control response can be increased, and as a result, there is provided an advantage that the output control response of the fuel cell can be increased.

According to the third aspect of the invention, since the longitudinal weight balance of the vehicle can be improved by disposing the heavy fuel cell substantially at the longitudinally central position, there is provided an advantage that the behavioral stability of the vehicle can be increased. In addition, since, even when an excessive impact is applied to the front part or rear part of the vehicle from the outside, a direct transfer of the impact so applied to the fuel cell can be avoided, there can be provided an advantage that it becomes difficult for the fuel cell to be subjected to a damage.

According to the fourth aspect of the invention, the apparatuses of the fuel cell which are accommodated within the fuel cell system box can be protected from the external inputs such as water, mud and chipping and the serviceability of these apparatuses for maintenance can also be increased. In addition, there can be provided an advantage that an abrupt operation of the fuel cell output setting unit can be prevented.

According to the fifth aspect of the invention, since the temperature regulating unit, the fuel cell and the fuel supply regulating unit are arranged so as to align in the longitudinal direction of the vehicle rather than being collected at one location, the constraint on securement of sufficient spaces in the passenger and luggage compartments can be reduced.

According to the sixth aspect of the invention, since the length of the cooling fluid piping can be decreased to a shortest level while securing a certain insulation distance, not only can the weight of the cooling fluid piping be decreased but also the quantity of the cooling fluid held within the cooling fluid piping can be decreased. Therefore, since the quantity of the cooling fluid can be decreased to a minimum level, it is possible to attempt to decrease the weight of the fuel cell vehicle.

According to the seventh aspect of the invention, the increase of the length of the cooling fluid piping can be restrained at the minimum while making it possible to regulate the temperature of the fuel supply regulating unit by using the cooling fluid held in the cooling fluid piping.

According to the eighth aspect of the invention, the increase of the volume of the fuel cell system box which is caused by accommodating the humidification unit therein can be restrained while making it possible to regulate the temperature of the humidification unit by using the cooling fluid held in the cooling fluid piping.

According to the ninth aspect of the invention, the length of the fuel piping can be decreased to a shortest dimension.

What is claimed is:

1. An on-board fuel cell powered electric vehicle comprising:

a fuel cell generating electricity by being supplied with a fuel and an oxidant;

a temperature regulating unit regulating the temperature of the fuel cell by sending out a cooling fluid through a pipe unit;

a fuel supply regulating unit regulating a supply condition in which the fuel is supplied to the fuel cell;

a humidification unit supplying water to the fuel cell by humidifying at least one of the fuel and the oxidant using a humidifier;

a fuel cell output setting unit setting whether or not electric power can be taken out of the fuel cell; and an exhaust unit exhausting a gas discharged from the fuel cell from a rear of the vehicles; wherein the temperature regulating unit and the fuel cell output setting unit are arranged to align in a transverse direction of the vehicle so as to constitute a first group, whereas the fuel supply regulating unit and the humidification unit are arranged to align in the transverse direction of the vehicle so as to constitute a second group, whereby the first group, the fuel cell, the second group and the exhaust unit are arranged to align in that order from the front to rear of the vehicle;
wherein the first group, the fuel cell, the second group, and the exhaust unit are accommodated in a fuel cell system box disposed under a floor of the vehicle.

2. An on-board fuel cell powered electric vehicle as set forth in claim 1, wherein a radiator for cooling the cooling fluid is disposed ahead of the first group in a longitudinal direction of the vehicle, and wherein a fuel storage unit for storing the fuel is disposed rearward of the second group in the longitudinal direction of the vehicle.

3. An on-board fuel cell powered electric vehicle as set forth in claim 1, wherein the fuel cell is disposed substantially at a central position in the longitudinal direction of the vehicle.

4. An on-board fuel cell powered electric vehicle comprising:
- a fuel cell generating electricity by being supplied with a fuel and an oxidant;
- a temperature regulating unit regulating the temperature of the fuel cell by sending out a cooling fluid through a pipe unit;
- a fuel supply regulating unit regulating a supply condition in which the fuel is supplied to the fuel cell;
- a radiator cooling the cooling fluid; and
- a fuel storage unit storing the fuel, wherein
- the radiator, the temperature regulating unit and the fuel supply regulating unit are arranged to align in that order from the front to rear of the vehicle, with the fuel storage unit being disposed rearward of the fuel supply regulating unit in a longitudinal direction of the vehicle, and
- wherein the temperature regulating unit, the fuel cell and the fuel supply regulating unit are accommodated in a fuel cell system box disposed on an underside of a floor of the vehicle.

5. An on-board fuel cell powered electric vehicle as set forth in claim 4, further comprising a cooling fluid piping through which a cooling fluid flows which has implemented a heat exchange by passing through the temperature regulating unit, wherein a fuel cell inlet of the cooling fluid piping through which the cooling fluid is sent in toward the fuel cell and a fuel cell outlet of the cooling fluid piping through which the cooling fluid is sent out from the fuel cell are disposed at longitudinally rear positions of the vehicle.

6. An on-board fuel cell powered electric vehicle as set forth in claim 5, wherein the cooling fluid piping is disposed relative to the fuel supply regulating unit in such a manner as to enable a heat exchange therebetween.

7. An on-board fuel cell powered electric vehicle as set forth in claim 5, further comprising a humidification unit for supplying the fuel cell with water by humidifying at least one of the fuel and the oxidant using a humidifier, the humidification unit being provided in the fuel cell system box, wherein the fuel supply regulating unit and the humidification unit are arranged to align in the transverse direction of the vehicle, and wherein the cooling fluid piping is disposed relative to the humidification unit in such a manner as to enable a heat exchange therebetween.

8. An on-board fuel cell powered electric vehicle as set forth in claim 4, further comprising a fuel piping through which a fuel flows which has passed through the fuel supply regulating unit, wherein
- a fuel cell inlet of the fuel piping through which the fuel is introduced into the fuel cell and a fuel cell outlet of the fuel piping through which the fuel is discharged from the fuel cell are disposed at longitudinally rear positions of the vehicle.

* * * * *